(12) United States Patent
Toyoda

(10) Patent No.: US 12,547,310 B2
(45) Date of Patent: Feb. 10, 2026

(54) INFORMATION PROCESSING DEVICE

(71) Applicant: Faurecia Clarion Electronics Co., Ltd., Saitama (JP)

(72) Inventor: Akio Toyoda, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 295 days.

(21) Appl. No.: 17/956,135

(22) Filed: Sep. 29, 2022

(65) Prior Publication Data
US 2023/0103132 A1 Mar. 30, 2023

(30) Foreign Application Priority Data

Sep. 30, 2021 (JP) .................................. 2021-160435

(51) Int. Cl.
*G06F 3/04886* (2022.01)
*G06F 3/04817* (2022.01)
(Continued)

(52) U.S. Cl.
CPC ...... *G06F 3/04886* (2013.01); *G06F 3/04817* (2013.01); *G06F 3/0482* (2013.01); *G06F 3/04842* (2013.01)

(58) Field of Classification Search
None
See application file for complete search history.

(56) References Cited

U.S. PATENT DOCUMENTS

2006/0248474 A1* 11/2006 Kimotsuki ............ G06F 3/0482
715/810
2011/0314423 A1* 12/2011 Ohmiya ............... G06F 3/04892
715/845
(Continued)

FOREIGN PATENT DOCUMENTS

EP 4012348 A1 * 6/2022 ........... G06F 3/0484
JP 2010038620 A * 2/2010
(Continued)

OTHER PUBLICATIONS

Machine translation of JP2021168038A, retrieved from FIT Search tool. (Year: 2021).*
(Continued)

*Primary Examiner* — Linda Huynh
(74) *Attorney, Agent, or Firm* — Volpe Koenig

(57) ABSTRACT

To provide a technology wherein screen customization is performed more closely in accordance with the intention of the user, through more properly controlling user operation count.

An information processing device, comprising: a displaying unit for displaying a display screen that has at least one operating button; a storing unit for storing button control information that includes, for each operating button, a record of an operating count for the operating button; a drawing unit for determining the display format for the operating button, using at least the button control information, to draw the display screen; and an updating unit for incrementing the operating count corresponding to the operating button related to the first operation in the button control information when an input into one operating buttons displayed on the display screen is received, as a first operation, and no second operation that would cause a screen transition from the display screen to another screen that is different from the display screen is received within a predetermined time interval.

5 Claims, 10 Drawing Sheets

(51) Int. Cl.
    *G06F 3/0482*     (2013.01)
    *G06F 3/04842*     (2022.01)

(56) References Cited

U.S. PATENT DOCUMENTS

| | | | | |
|---|---|---|---|---|
| 2012/0140255 | A1* | 6/2012 | Tanaka | H04N 1/00938 |
| | | | | 358/1.13 |
| 2013/0125056 | A1* | 5/2013 | Suda | G06F 3/0488 |
| | | | | 715/846 |
| 2017/0046177 | A1* | 2/2017 | Yamashita | G06F 9/451 |
| 2017/0090727 | A1* | 3/2017 | Mashino | G06F 3/04842 |
| 2019/0361662 | A1* | 11/2019 | Azam | H04N 7/15 |
| 2020/0183547 | A1* | 6/2020 | Ryu | G06F 3/0488 |
| 2022/0164148 | A1* | 5/2022 | Watariuchi | G06F 3/1253 |

FOREIGN PATENT DOCUMENTS

| | | | |
|---|---|---|---|
| JP | 2011-096104 A | | 5/2011 |
| JP | 2017-037551 A | | 2/2017 |
| JP | 2021168038 A | * | 10/2021 |

OTHER PUBLICATIONS

Machine translation of JP2010038620A, retrieved Oct. 16, 2024 from FIT Search tool. (Year: 2024).*
Machine translation of JP2021168038A, retrieved Oct. 16, 2024 from FIT Search tool. (Year: 2024).*
Japanese Office Action issued on Mar. 11, 2025 for Japanese Patent Application No. 2021-160435.

* cited by examiner

Button Control Information

Screen Information

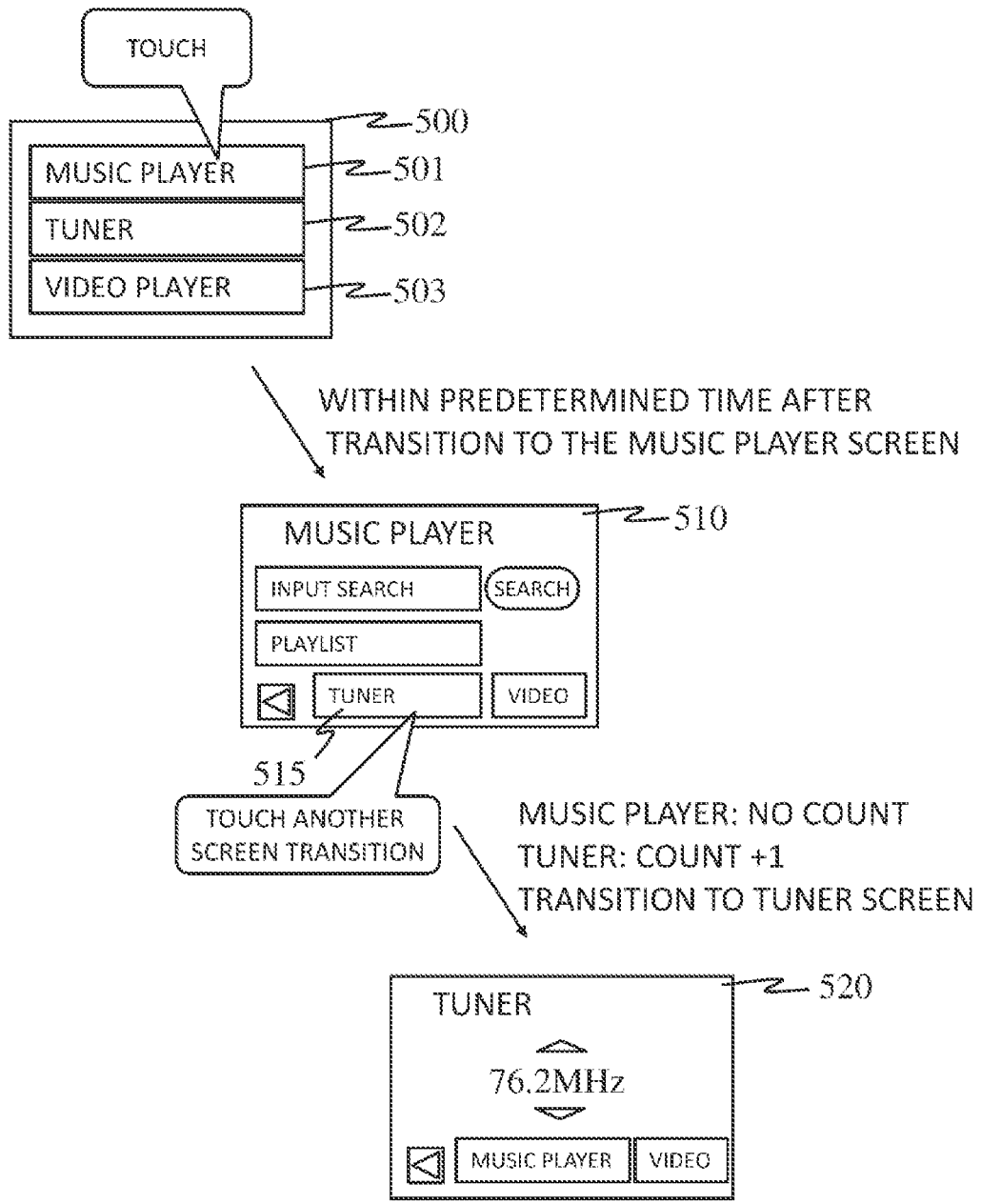

INFORMATION PROCESSING DEVICE

FIELD OF TECHNOLOGY

The present invention relates to a technology for an information processing device.

PRIOR ART

Patent Document 1 discloses a technology relating to a screen generating device "comprising: a screen generating unit for generating a display screen having a plurality of operating buttons; an operation history recording unit for recording, for each operating button, an operating count of a user the display screen; a comparing unit for comparing the operating count for each operating button, recorded in the operating history recording unit, against a first threshold value and against a second threshold value of a value that is larger than the first threshold value; a non-display subject setting unit for setting, as subject to non-display, an operating button determined, by the comparing unit, as having an operating count that is no greater than the first threshold value; and an enlarging subject setting unit for setting, as subject to enlargement, an operating button determined, by the comparing unit, as having an operating count that is no less than the second threshold value, wherein: if there is an operating button that has been set by the non-display subject setting unit as subject to non-display, the screen generating unit does not display the operating button on the display screen, and if there is an operating button set, by the enlarging subject setting unit, as subject to enlargement, causes the display size of the operating button on the screen to be larger than a standard."

PRIOR ART DOCUMENT

Patent Document 1—Japanese Unexamined Patent Application Publication 2017-37551

SUMMARY OF THE INVENTION

Problem Solved by the Present Invention

In the above technique, the number of user operations is uniformly counted for the operating buttons, and unintended operations such as erroneous operations are also counted. Therefore, there is a possibility that the screen display is transitioned to an unintended one.

The object of the present invention is to provide a technology wherein screen customization is performed more closely in accordance with the intention of the user, through more properly controlling user operation count.

Means for Solving the Problem

While the present invention includes a plurality of means for solving, at least partially, the problem set forth above, examples thereof are as below:

In order to solve the problems set forth above, an information processing device according to the present invention comprises: a displaying unit for displaying a display screen that has at least one operating button; a storing unit for storing button control information that includes, for each operating button, a record of an operation count for the operating button; a drawing unit for determining the display style for the operating button, using at least the button control information, to draw the display screen; and an updating unit for incrementing the operation count corresponding to the operating button related to the first operation in the button control information when an input into one operating buttons displayed on the display screen is received, as a first operation, and no second operation that would cause a screen transition from the display screen to another screen that is different from the display screen is received within a predetermined time interval.

Effects of the Invention

The present invention enables screen customization to be performed more closely aligned with user intentions by more properly controlling user operating counts. Other objects, structures, and effects will become apparent through explanations of embodiments, below.

BRIEF DESCRIPTIONS OF THE DRAWINGS

FIG. 11 is a diagram showing another example of counting for an operating button.

FORMS FOR PERFORMING THE PRESENT INVENTION

Figure 1:
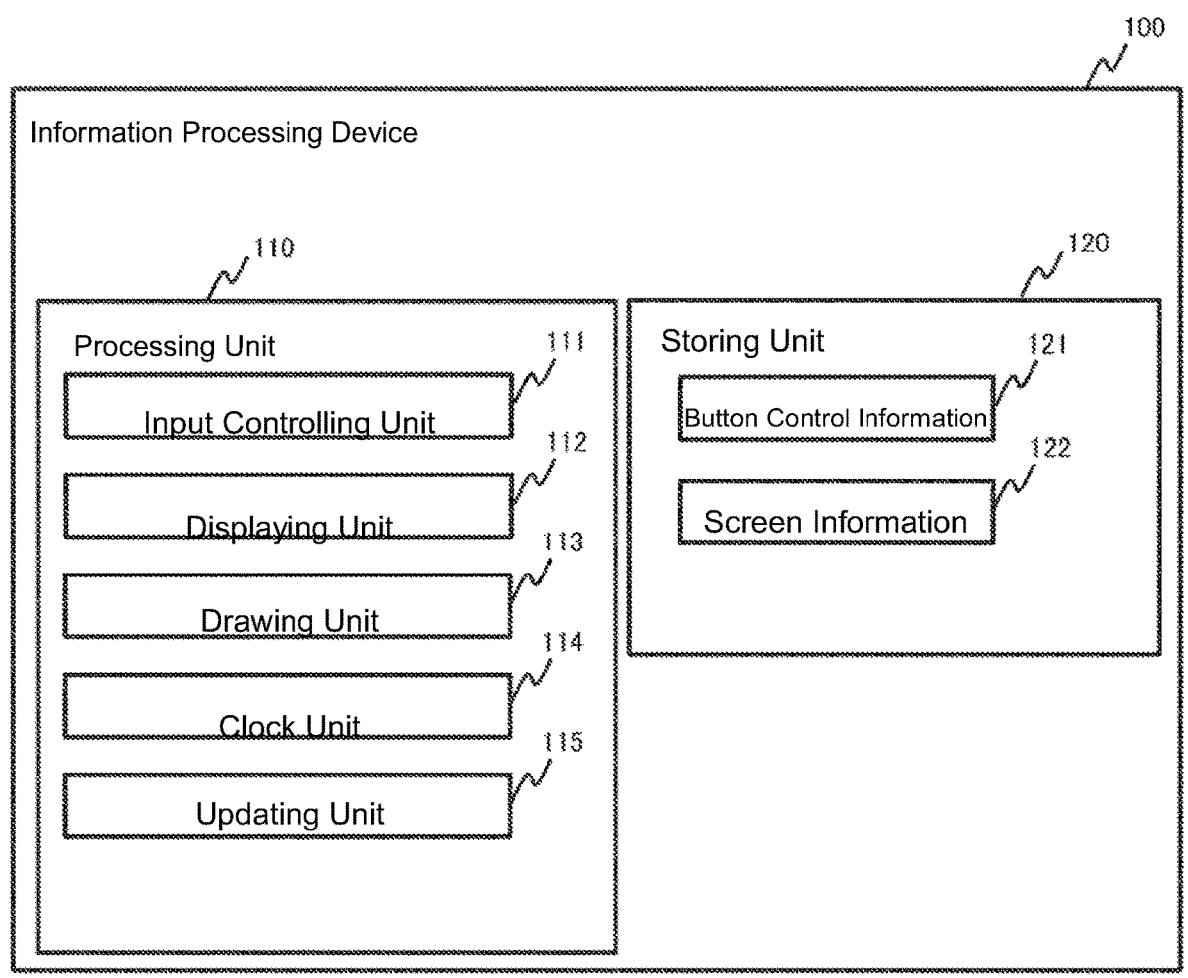
FIG. 1 is a diagram showing an example of a structure of an information processing device.

An information processing device according to an embodiment of the present invention will be described below with reference to the drawings. It should be noted that FIG. 1 through FIG. 11 do not show all the configurations of the information processing device according to the present invention, but for ease of understanding, units of the configurations are omitted as appropriate. In the following embodiments, when it is necessary for convenience, the description will be divided into a plurality of sections or embodiments. However, unless otherwise specified, they are not unrelated to each other, and one is in relation to some or all of the other modifications, details, supplementary explanation, etc.

Additionally, when referencing numbers, and the like of elements (including quantities, numeric values, magnitudes, ranges, and the like) in the embodiments below, unless stated explicitly or there is clearly a limitation to a specific number in principle, there is no limitation to the specific number, and the number may be greater than or less than the specific number.

Furthermore, in the following embodiments, a structural element (including an elemental step, or the like) is not necessarily essential, unless explicitly stated or clearly considered essential in principle.

Similarly, in the following embodiments, references to shapes, positional relationships, and the like, of the structural elements, and the like, include approximations or similarities that are substantially those shapes, or the like, except for when stated explicitly or when clearly one may be led by principal to believe otherwise. This is true for numeric values and ranges as well.

Note, in all the drawings for explaining the embodiment, the same members are shown by the same reference numerals as a general rule, and the repeated description thereof may be omitted. In addition, in the following embodiments, the terms "comprising A," "made from A," "having A," and "including A" are not meant to exclude other elements, except for the case where only the elements are clearly indicated.

Similarly, in the following embodiments, when referring to the shape, positional relationship, etc., of the components, etc., it is to include those that are substantially similar to or similar to the shape, etc., except when it is specifically clearly indicated or when it is considered to be clearly not so in principle.

Embodiment 1

The present embodiment shows an embodiment in an information processing device wherein screen customization is performed in response to operations by the user of a vehicle, in an information processing device 100 that is installed in a vehicle. Note that the information processing device 100 is not limited to an automobile, but rather can be applied to diesel trains, electric trains, boats, ferries, and other vehicles. Moreover, the information processing device 100 can also be applied to smart phones and information processing devices for offices, along with various types of IT (Information Technology) devices for the home, and further to game machines, and the like, for home use.

FIG. 1 is a diagram showing a structural example of an information processing device. The information processing device 100 includes at least a processing unit 110 and a storing unit 120. The processing unit 110 includes an input controlling unit 111, a displaying unit 112, a drawing unit 113, a clock unit 114, and an updating unit 115. The storing unit 120 stores button control information 121 and screen information 122.

Figure 2:
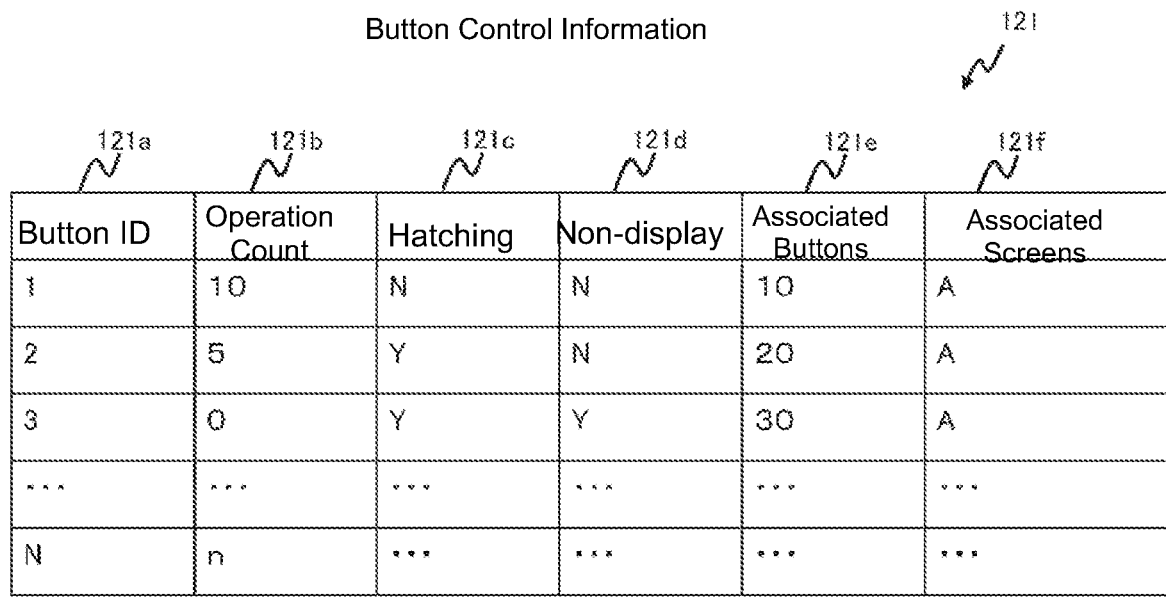
FIG. 2 is a diagram showing an example of a data structure for button control information.

FIG. 2 is a diagram showing an example of a data structure for button control information. In the button control information 121, an operation count 121b, hatching 121c, non-display 121d, associated buttons 121e, and associated screens 121f are stored corresponding to each button ID 121a. An identifier that uniquely identifies the operating button is stored in the button ID 121a. Note that a "button" in the present embodiment may be any operating button including both buttons that receive inputs from software processes and physical buttons as hardware. Additionally, the operating buttons are buttons that trigger operations that involve screen transitions or pop-up displays when an input is received.

The operation count 121 b stores information indicating the number of times the operating button specified by the button ID 121 a has been operated. The hatching 121 c stores information specifying whether or not to use a display style wherein the operating button specified by the button ID 121 a is displayed with identifiable display (emphasized display, deemphasized display, etc.). The non-display 121 d stores information specifying whether or not to use a display style wherein the operating button specified by the button ID 121 a is not displayed. The associated button 121 e stores information specifying an operating button related to the operating button specified by the button ID 121 a, specifically, an operating button for realizing a function dependent on the operating button specified by the button ID 121 a. For example, when the operating button specified by the button ID 121 a is a button for playing music, the related button 121 e stores information specifying a volume button or the like to be realized on the same screen at the time of music playback. The associated screen 121 f stores information specifying a screen containing an operating button specified by the button ID 121 a.

Figure 3:
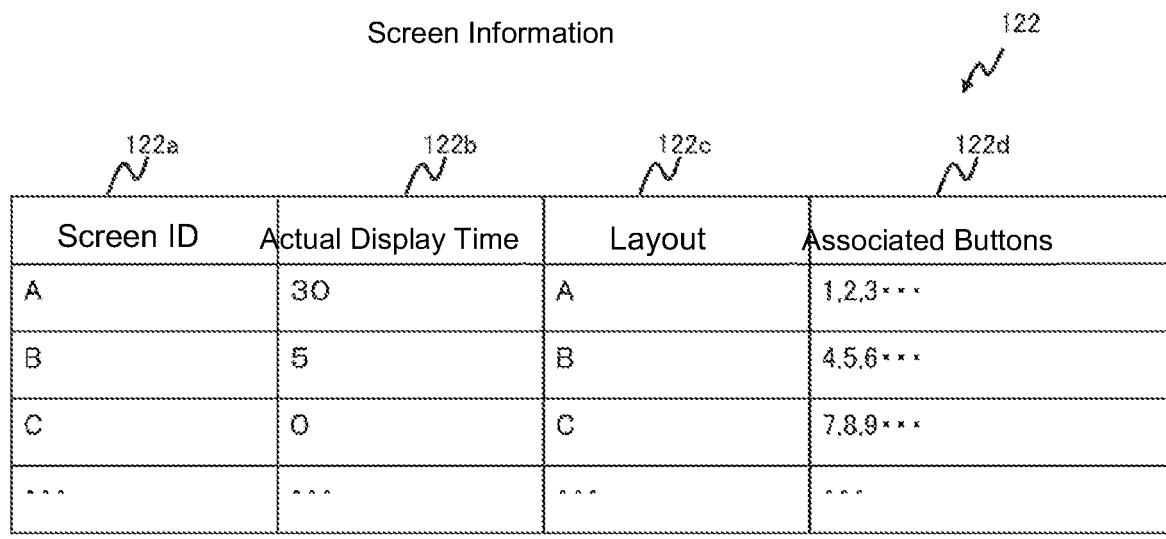
FIG. 3 is a diagram showing an example of a data structure for screen information.

FIG. 3 is a diagram showing an example of a data structure for screen information. In the screen information 122, actual display time 122b, layout 122c, and associated buttons 122d are stored corresponding to each individual screen ID 122a in the screen information 122. Identifiers for uniquely identifying screens are stored in the screen ID 122a.

The actual display time 122 b stores information specifying the actual time that has been displayed the screen specified by the screen ID 122 a. The layout 122 c stores information specifying layout data to be applied to the screen specified by the screen ID 122 a. The associated button 122 d stores information specifying an operating button related to the screen specified by the screen ID 122 a, specifically, an operating button included in the screen specified by the screen ID 122 a. For example, when the screen specified by the screen ID 122 a is a music playback screen, the associated button 122 d stores information specifying a music selection button, a play/stop button, or the like to be realized on the same screen at the time of music playback. However, there is no limitation thereto, and the associated buttons may be any relevant buttons.

The input controlling unit 111 detects an input into an operating button. Specifically, the input controlling unit 111 detects an input from a user (generally a touch input through a touch panel), and identifies the inputted coordinates and the input type (a tap, a long tap, a flick, a pinch, or the like). Conversely, the input controlling unit 111 receives an input from the user through a hardware button (for example, buttons for increasing/decreasing the volume).

The displaying unit 112 displays a display screen that has one or more operating buttons. The display screen is drawn by the drawing unit 113, described below. Normally there is at least one operating button, including a "Back" button for returning to the state prior to the screen transition.

The drawing unit 113 uses at least button control information 121 to determine the shape of the display for each operating button, and draws a display screen. More specifically, the drawing unit 113 modifies the display style of each of the operating buttons so that, when the operating button is to be hatched, the operating button is hatched and displayed. Similarly, the drawing unit 113 does not display each of the operating buttons when they are not to be displayed. That is, the display style is modified to an invisible. Additionally, the drawing unit 113 uses the button control information 121 and the screen information 122 to determine the display style for each individual operating button, and draws the display screen. More specifically, the drawing unit 113 draws a display screen by displaying the operating buttons so as to be distinguishable when the number of times the operating buttons are operated is below a predetermined second threshold for the operating buttons included in the display screen whose display time is equal to or longer than a predetermined first threshold. In this case, the first threshold value will vary depending on the time of use of the information processing device 100, and the second threshold value will vary with the total operation count of the operating buttons that are included in the display screens that include the operating button.

A clocking unit 114 starts clocking when receiving a request and responds the elapsed time from the clocking start in response to the request. Additionally, when a predetermined period has elapsed, the clock unit 114 provides notification that the period has elapsed.

The updating unit 115 increments the operation count of an operating button. Specifically, when an input to one of the operating buttons displayed on the display screen is received as a first operation, the updating unit 115 counts up the number of operations associated with the operating button related to the first operation in the button control information when a second operation for changing from the display screen to another screen different from the display screen within a predetermined time is not accepted.

Recently there have been improvements in functionality of onboard information processing devices such as navigation devices, and the like, which has tended to be accompanied by an increase in the number of operating buttons in each operating screen. On the other hand, an increased number of operating buttons may adversely affect the convenience for the user, inherently tied to reduced ease of operations.

In view of the above, the information processing device 100 secures the convenience of the user by setting the operating buttons which are not used to be hidden from the operating screen, and also making the operating buttons which are subordinate to the operating buttons to be hidden. Moreover, the display of the operating button is modified by more accurately reflecting the use state of the user by determining the erroneous operation of the user and not reflecting it in the operating history. Furthermore, the standard for used/not used involves other operating buttons within the same screen. For this reason, there is a possibility that determination based only on the number of operations of a single operating button may not be appropriate, and it is considered more appropriate to make a modify according to how the user uses the button. Therefore, the operating states of other operating buttons within the same screen should be reflected into the standards.

Figure 4:
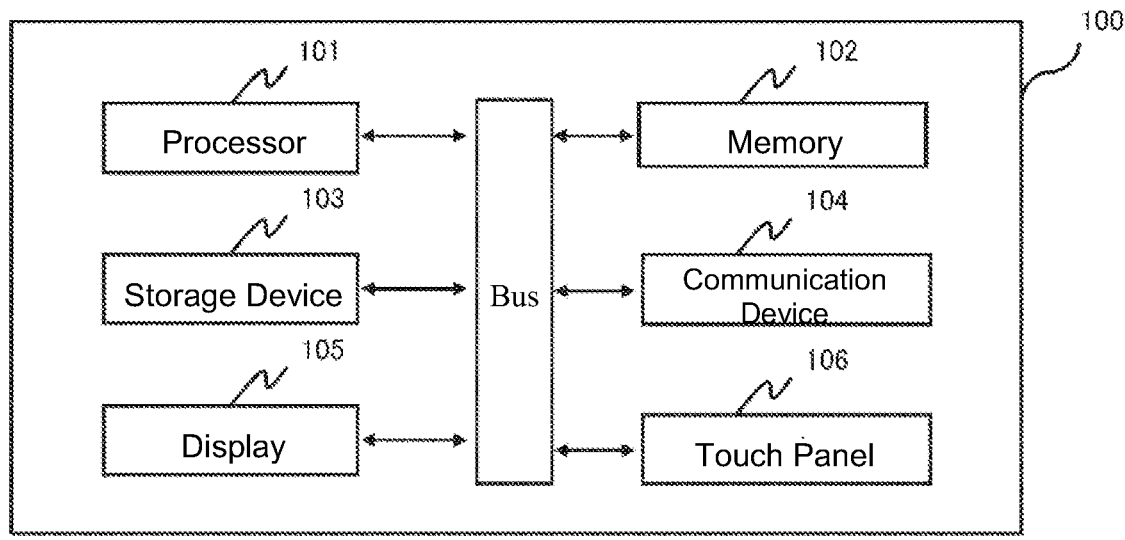
FIG. 4 is a diagram showing an example hardware structure for an information processing device.

FIG. 4 is a diagram showing a hardware structure for an information processing device. The information processing device 100 is achieved through a typical information processing device that comprises, for example, a processor (for example, a CPU: Central Processing Unit or a GPU: Graphics Processing Unit) 101; a memory 102 such as a RAM (Random Access Memory), or the like; a storage device 103 such as a hard disk device (Hard Disk Drive: HDD), an SSD (Solid State Drive), or the like; a communication device 104 that is responsible for the interface for connecting through a network for communication; a display 105; a touch panel 106; and a bus for connecting these together.

Each functional unit of the processing unit 110, described above, that is, the input controlling unit 111, the displaying unit 112, the drawing unit 113, the clock unit 114, and the updating unit 115, is structured through the processor 101 reading in and executing a predetermined program. For this, the program for achieving the processes of the various functional units is stored in the memory 102 or the storage device 103. Additionally, the program is loaded into the memory 102 at runtime, to be processed by the processor 101.

The button control information 121 and the screen information 122 is achieved through the memory 102 or the storage device 103.

Figure 5:
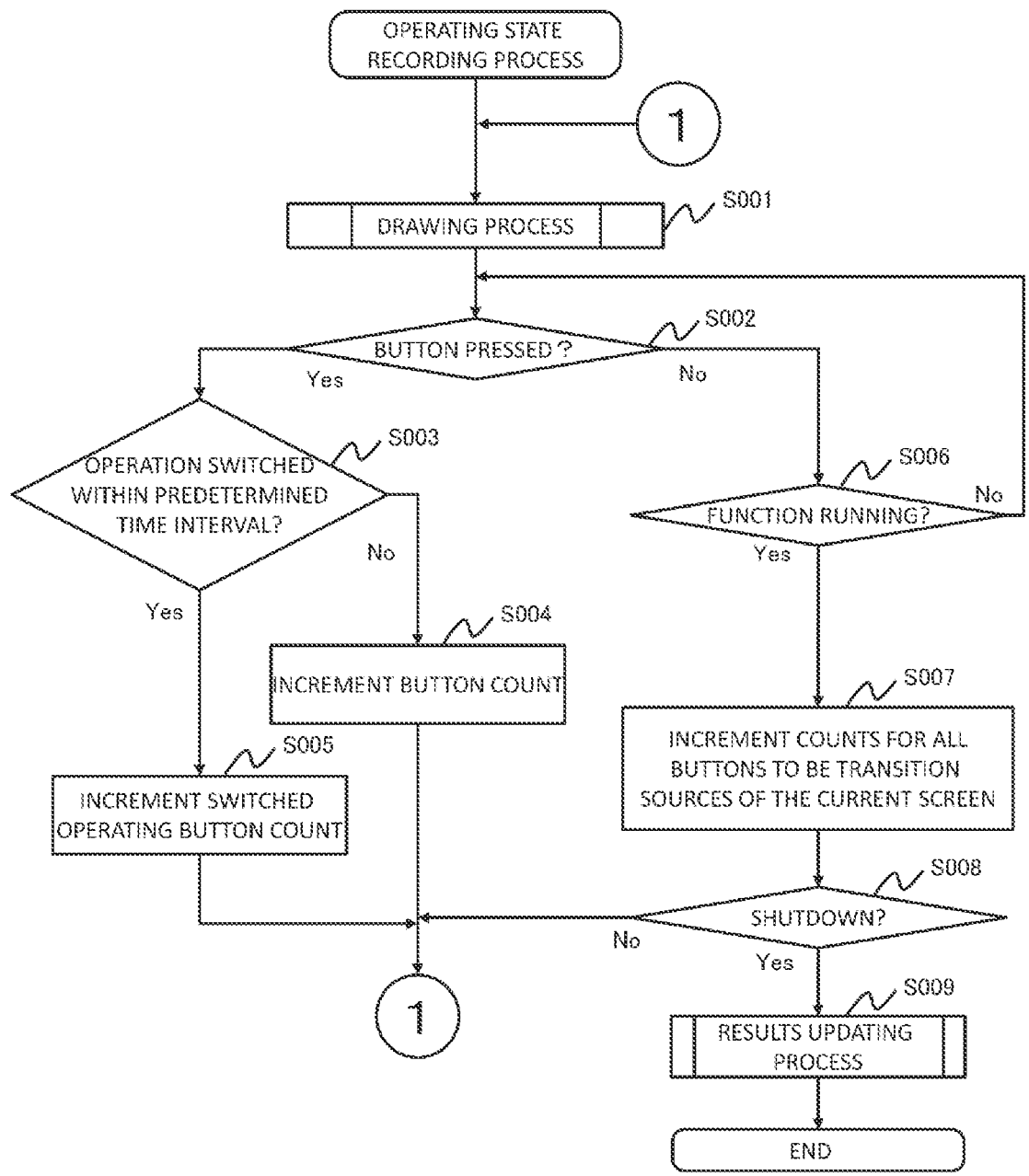
FIG. 5 is a diagram showing an example of a process flow for an operating state recording process.

FIG. 5 is a diagram showing an example of the process flow of the operating state recording process. The operating state recording process begins when the information processing device 100 starts up so as to enable operations. In the present embodiment, the information processing device 100 is a vehicle-mounted device, and thus starting up to enable operations is the timing (ACC_ON) when the accessory power supply of the vehicle in which the device is installed is turned ON.

First the drawing unit 113 performs a drawing process, described below (Step S001). Specifically, the drawing unit 113 draws a screen corresponding to the screen ID of the current display object according to the layout 122 c, and arranges and draws buttons having the operating button IDs included in associated buttons 122 d.

The drawing unit 113 draws the operating buttons after determining the display styles thereof by referencing the button control information 121.

Following this, the input controlling unit 111 determines whether or not a button has been operated (Step S002). Specifically, the input controlling unit 111 determines whether or not there has been an input into an operating button on the screen, and determines whether or not the input was either a tap or a long tap, to determine whether or not there has been a button operation.

If there has been a button operation ("Yes" in Step S002), the updating unit 115 determines whether or not the operation has been switched within a predetermined time (for example, within two seconds) (Step S003). Specifically, the updating unit 115 acquires, through the input controlling unit 111, whether a tap or a long tap is made to an operating button different from the button operation detected in step S002. If there has been either a tap or a long tap on the different operating button, the updating unit 115 determines that the operation has been switched.

If the operation has not been switched ("No" in Step S003), the updating unit 115 increments the count for the operating button (Step S004). Specifically, the updating unit 115 deems that the operating button that has received the input in Step S002 has been operated, so increments the count. Following this, the drawing unit 113 returns control to Step S001, and draws the screen that is the destination for the screen transition by the operating button.

When the operation has been switched ("Yes" in Step S003), the updating unit 115 increments the count for the switched operating button (Step S005). Specifically, the updating unit 115 deems that the operating button after the switched has been operated, and increments the count. That is, the updating unit 115 determines that the operating button that was switched was operated unintentionally, and it does not increment the count for the button. Given this, the drawing unit 113 returns control to Step S001, and draws the screen that is the destination for the screen transition by the operating button after the switched.

If no button operation has been performed ("No" in Step S002), the updating unit 115 determines whether or not function execution is in progress (Step S006). Specifically, the updating unit 115 determines whether or not a predetermined function provided by the information processing device 100 (for example, a navigation function, a video playing function, a music playing function, a radio tuner function, or another function provided to the user through a predetermined software program) has started and is providing output. If function execution is not in progress ("No" in Step S006) the drawing unit 113 returns control to Step S002.

If the function is being executed ("Yes" in Step S006), the updating unit 115 increments counts for all the operating buttons to be transition sources of the current screen (Step S007). This is because when the function is being executed, it is necessary to record that the function is being used regardless of the transition source by similarly counting up any of the operating buttons of the transition source.

Additionally, the updating unit 115 determines whether or not shutdown of the information processing device 100 has commenced (Step S008). If no shutdown has been started ("No" in Step S008), the drawing unit 113 returns control to Step S001, and refreshes the drawing of the current screen.

If a shutdown has started ("Yes" in Step S008), the updating unit 115 performs the history updating process described below (Step S009). Following this, the updating unit 115 terminates the operating state recording process.

The above is the flow of the operating state recording process. The operating state recording process makes it possible to acquire an operating history that eliminates unintended operations when an operation has been received by an operating button involving a screen transition or a pop-up display.

Figure 6:
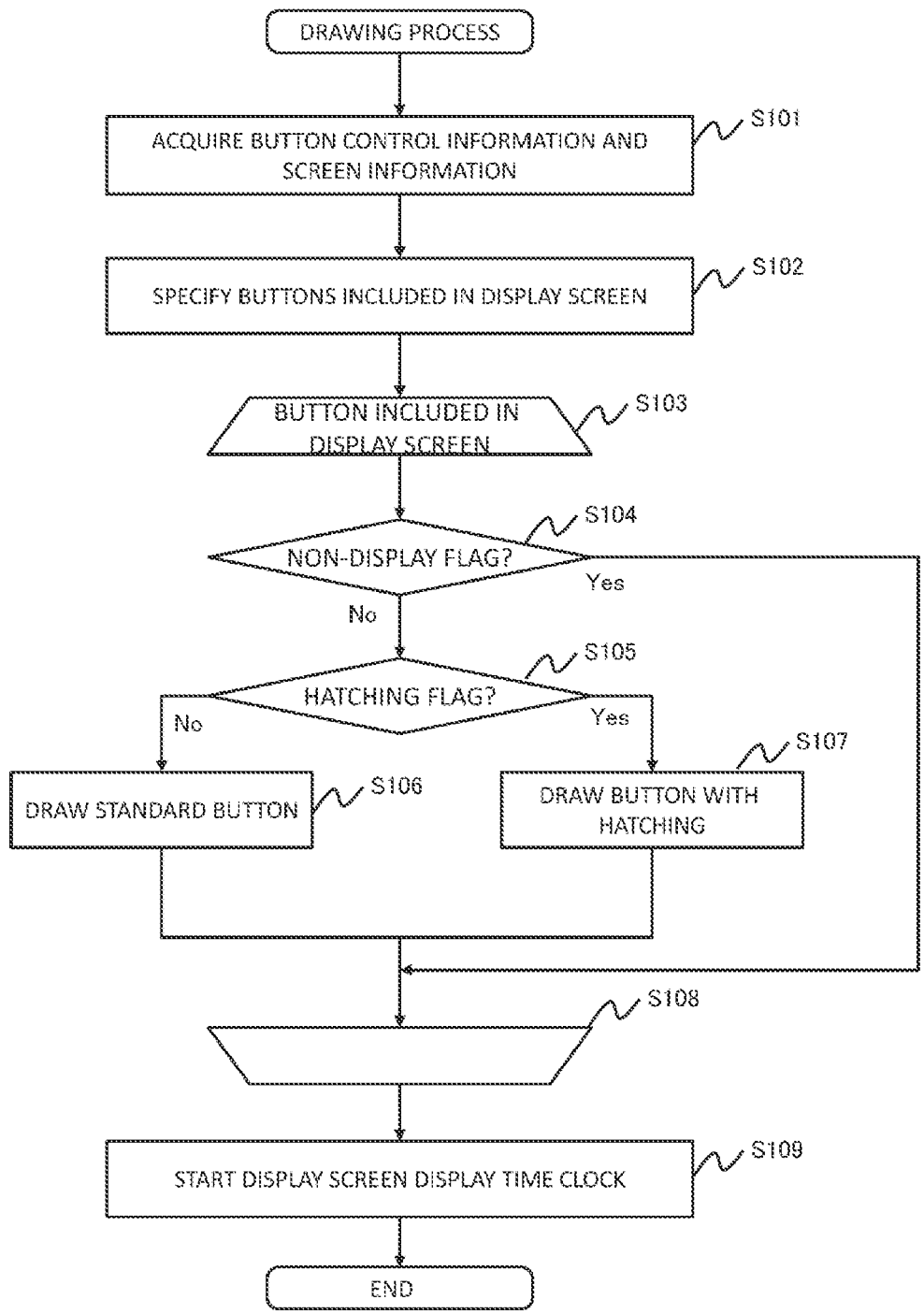
FIG. 6 is a diagram showing an example of a process flow for a drawing process.

FIG. 6 is a diagram showing an example of the process flow in the drawing process. The drawing process is started by Step S001 of the operating state recording process.

First the drawing unit 113 acquires button control information and screen information (Step S101).

Specifically, the drawing unit 113 reads the button control information 121 and the screen information 122.

Given this, the drawing unit 113 specifies the button(s) included in the display screen (Step S102). Specifically, the drawing unit 113 reads the button ID of the operating button associated with the screen ID to be displayed from the associated button 122 d.

Following this, the drawing unit 113 executes the processes in Step S104 through S107 for each of the operating buttons included in the display screen (Step S103, S108).

The drawing unit 113 determines whether or not the non-display flag is set to "Y (Yes)" (Step S104). Specifically, the drawing unit 113 refers to the button control information 121 and determines whether or not the value of the non-display 121 d related to the object button ID 121 a is "Y (Yes)". If the non-display flag is set to "Y (Yes)" ("Yes" in Step S104), the drawing unit 113 either draws the operating button with the non-display attribute, or advances control to Step S108 without displaying the button, to set the next operating button as the object button.

If the non-display flag is set to "N (No)" ("No" in Step S104), the drawing unit 113 determines whether or not the hatching flag is set to "Y (Yes)" (Step S105). Specifically, the drawing unit 113 refers to the button control information 121 and determines whether or not the value of hatching 121c related to the object button ID 121a is "Y (Yes)".

If the hatching flag is set to "N (No)" ("No" in Step S105), the drawing unit 113 draws the operating button using the standard display style (Step S106). For example, the standard display style is the default display style according to the layout information of the screen. Additionally, the drawing unit 113 advances control to Step S108, to set the next operating button as the subject button.

If the hatching flag is set to "Y (Yes)" ("Yes" in step 105), the drawing unit 113 draws the operating button in the display style of the identifiable display (step 107). For example, the display style that expresses an identifiable display may be that of changing the display of the operating button to superimpose a graphic with a hatching pattern. Note that there is no limitation thereto, but rather, for example, the saturation of the color may be reduced. Following this, the drawing unit 113 advances control to Step S108, to set the next button as the subject button.

The clock unit 114 begins clocking the display time for the display screen (Step S109).

The above is the flow of the drawing process. The drawing process makes it possible to perform a hatching display for an operating button that is object to hatching display in the button control information 121 when drawing the screen, or drawing without displaying an operating button that is object to non-display.

Figure 7:
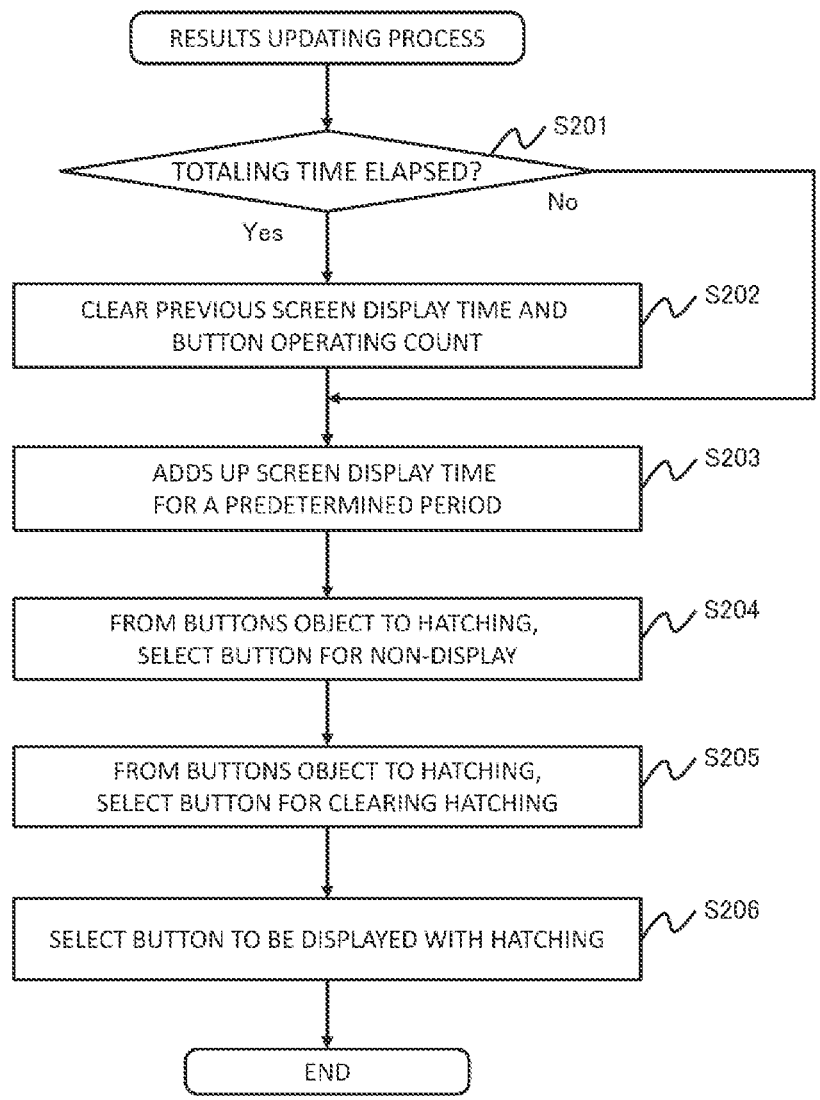
FIG. 7 is a diagram showing an example of a process flow for a history updating process.

FIG. 7 is a diagram showing an example of the process flow of the history updating process. The history updating process is started by Step S009 of the operating state recording process.

First the updating unit 115 determines whether or not a totaling period has elapsed (Step S201). Specifically, the updating unit 115 requests the date and time information from the clock unit 114, and determines whether or not a predetermined totaling period (for example, one week.) has elapsed from the start of the current totaling period. If the totaling period has not elapsed ("No" in step 201), the updating unit 115 advances the control to step 203.

If the totaling period has elapsed ("Yes" in Step S201), the updating unit 115 clears the screen display time and the button operation count in the previous period (Step S202).

Specifically, the updating unit 115 zeroes the operation count 121b for the button control information 121 and zeroes the actual display time 122b for the screen information 122.

Following this, the updating unit 115 adds up the screen display times for a predetermined period (Step S203). Specifically, the updating unit 115 adds up the screen display time in the current totaling period for each display screen, and stores the result in actual display time 122b.

Following this, the updating unit 115 selects a button to be a non-display object from the hatching object buttons (Step S204). Specifically, the updating unit 115 extracts the operating buttons in which the value of the hatching 121 c of the button control information 121 is "Y (Yes)" and the value of the non-display 121 d is "N (No)". Further, the operating button whose display screen to which the extracted operation button belongs is "screens that are frequently displayed" is set as a non-display object. Specifically, the updating unit 115 determines a display screen satisfying the following condition (1) is a "screen that is displayed frequently."

Condition (1): That actual display time 122b of the target display screen for one week is 10% or more of the totaling time from "ACC_ON" to "ACC_OFF" (That is, almost from getting on to getting off) in the same period.

Given this, when the operating button belonging to the display screen satisfying the Condition (1) above is extracted, the updating unit 115 further sets the non-display 121 d of the operating button to "Y (Yes)" if that operating button has not been "frequently operated." Specifically, the updating unit 115 determines whether or not the operation count 121 b of the operating button satisfies the following Condition (2), and if so, determines that the operating button is not "frequently operated". Note that there is no limitation to the condition (1), described above, but rather Condition (1'), below, may be used instead.

Condition (1'): The actual display time 122 *b* of the target display screen for one week is 10% or more of the totaling time of "parking brake OFF" (That is, almost from departure to stop.) for the same period.

Condition (2): It is less than ½ of the overall average of the operation counts 121 *b* of the other buttons belonging to the display screen to which the operating button belongs.

Following this, the updating unit 115 selects a button for releasing the hatching from the button to be hatched (step 205). Specifically, the updating unit 115 extracts the operating button in which the value of the hatching 121 *c* of the button control information 121 is "Y (Yes)" and the value of the non-display 121 *d* is "N (No)". Further, the hatching 121 *c* of the operating button set to "N (No)" for the operating button for which the extracted operating button is operated one or more times during the current totaling period.

The updating unit 115 selects a button to be hatched from the buttons not to be hatched (step 206). Specifically, the updating unit 115 extracts the operating button in which the value of the hatching 121 *c* of the button control information 121 is "N (No)" and the value of the non-display 121 *d* is "N (No)". Further, the hatch 121 *c* of the operating button satisfying the Conditions (1) and (2) above is set to "Y (Yes)".

The above is the flow of the history updating process. The history updating process makes it possible to update the information necessary for drawing with hatching, or not displaying, when performing screen drawing for operating buttons that satisfy predetermined standards. Note that in order to display again buttons that are no longer displayed, a Reset button for clearing the values for hatching 121*c* and non-display 121*d* to "N (No)" may be provided in a top screen or Settings screen of a menu, not shown, making possible to return to the default state the display date for the operating buttons.

Figure 8:
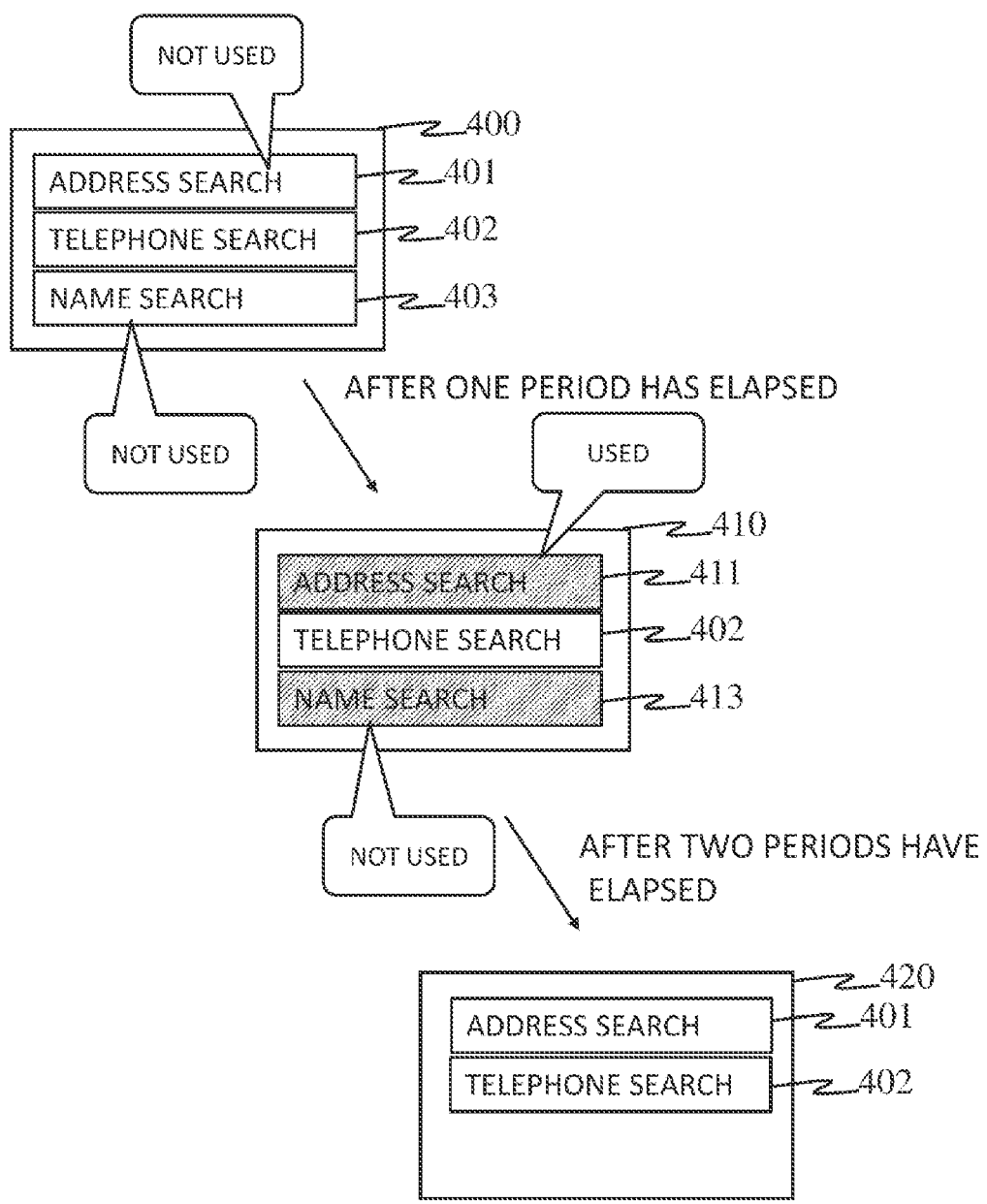
FIG. 8 is a diagram showing an example of a display format for an operating button.

FIG. 8 is a diagram showing an example of a display format for an operating button. In the screen display 400 of the default state, Address Search 401, Telephone Search 402, and Name Search 403 are displayed as the operating buttons. Here, if the Address Search 401 and the Name Search 403 are not used (no operation) in the totaling period, the unused operating buttons are displayed as the hatch display Address Search 411 and the hatch display Name Search 413 in the totaling period after 1 period as shown in the screen display 410 after 1 period has elapsed. Here, if the hatching display Address Search 411 is used and the hatching display Name Search 413 is not continuously used, the used Address Search 401 and the Telephone Search 402 are normally displayed and the unused Name Search operating button is not displayed in the totaling period after 2 periods have elapsed, as shown by the screen display 420 after 2 periods have elapsed.

Figure 9:
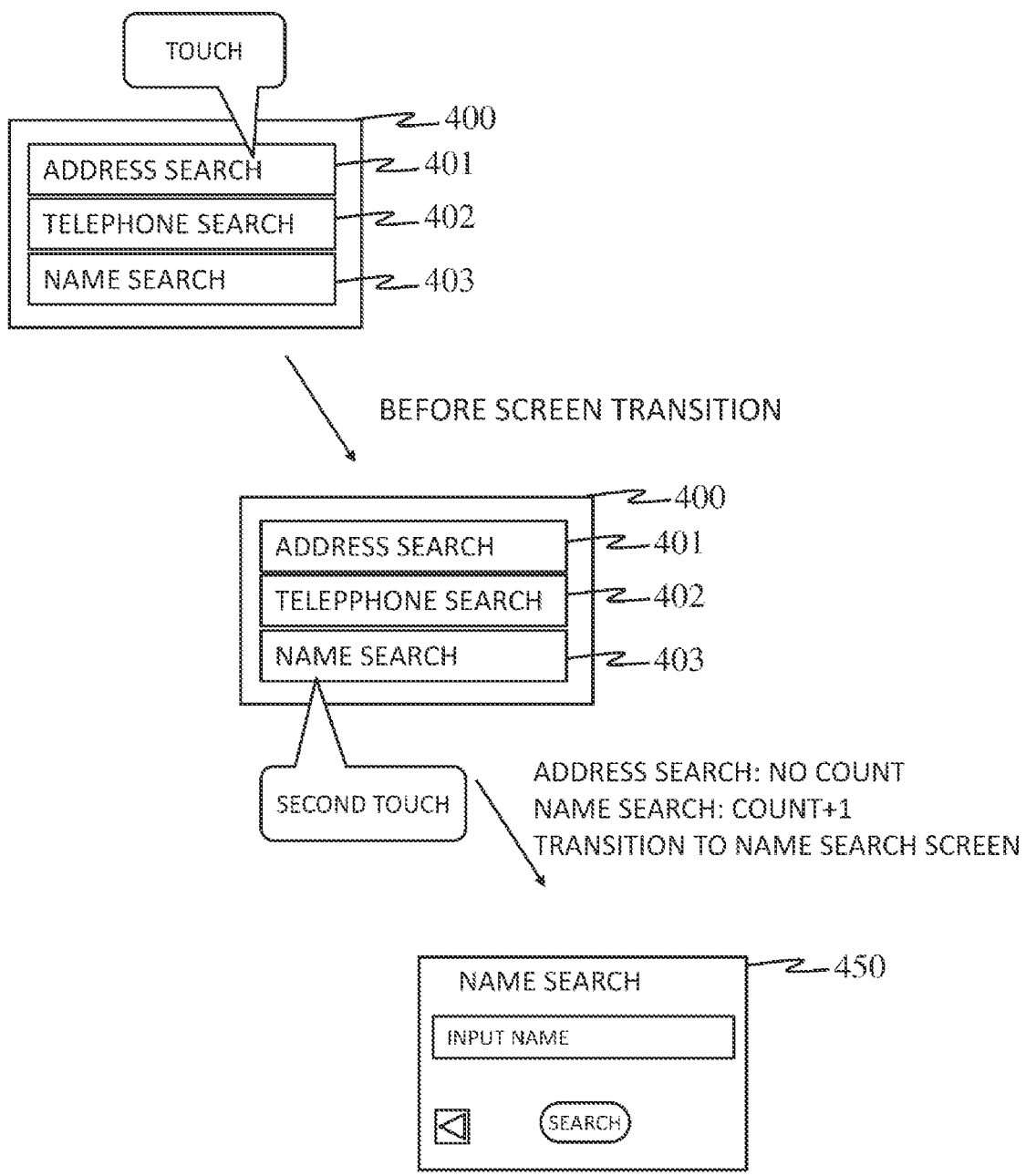
FIG. 9 is a diagram showing an example of counting for an operating button.

FIG. 9 is a diagram showing an example of counting for the operating buttons. In Step S003 through S005 of the operating state recording process, when an operating instruction for performing transition to another screen within a predetermined time is given before the screen transition, it is determined that the operation is transitioned within the predetermined time. This situation will be specifically described with reference to FIG. 9.

In FIG. 9, as with FIG. 8, in the screen display 400 of the default state, Address Search 401, Telephone Search 402, and Name Search 403 are displayed as operating buttons. On the screen display 400, in a state where an operating button of the Address Search 401 is touched and input is performed, and then 2 seconds before elapse (when screen transition is not performed yet), the operating button of the Name Search 403 is touched and the screen 450 of the name search function is transited, the operation input to the operation button of the Address Search 401 is not recorded (not counted), and the operation input to the operating button of the Name Search 403 is recorded (counted). This is because it corresponds to the case where the operation is switched in Step S003 of the operating status recording process ("Yes" in S003), and the touch input to the operating button of the Address Search 401 is considered to be an erroneous operation.

Additionally, there is no limitation to touch inputs on operating buttons, but rather the operation count for operating buttons may be incremented when there has been an operation using a smart phone, or the like, as an inputting device. Specifically, when a smart phone, or the like, is connected communicatively, either through physical wiring or wirelessly, to the information processing device 100, and a function for executing automatically a function within the smart phone (music playback, or the like) is provided in the information processing device 100, the operation count can be incremented for the operating button that launches the corresponding function of the information processing device 100.

The above is an example of an embodiment according to the present invention. Through the information processing device according to the present embodiment screen customization can be performed more closely aligned to the intentions of the user through controlling the user operation count more properly. Additionally, the information processing device according to the present embodiment enables the buttons with low operation counts on screens with high display frequencies to be hidden.

However, the present invention is not limited to the embodiment according to above. The embodiment according to above may be modified in a variety of ways within the scope of the technical concept and idea of the present invention.

For example, while, in the operating state recording process shown in FIG. 5 of the embodiment described above, the incrementing of the count for the operating button was performed for the operating button after switching when the operation was switched within a predetermined time interval, prior to the screen changing, after a button operation was detected (after "Yes" in Step S002), there is no limitation thereto. Instead, for example, if the display screen has been returned to the display screen prior to the screen transition, or another function of a similar category (such as, for example, starting the tuner playback function from the music playback function within the audio category, or the like) is performed, the other function, or the returned screen, may be handled as being execution of the function intended by the user.

That is, when the updating unit 115 receives an input to one of the operating buttons displayed on the first display screen, which is the display screen, as a first operation, and does not receive a second operation that transits to a different screen from the second display screen on the second display screen of the transition destination that is transited by the first operation within a predetermined time, the number of operations associated with the operating button for the first operation may be counted up in the button control information 121. Such a modified example will be described with reference to FIGS. 10 and 11.

Modified Example

Figure 10:
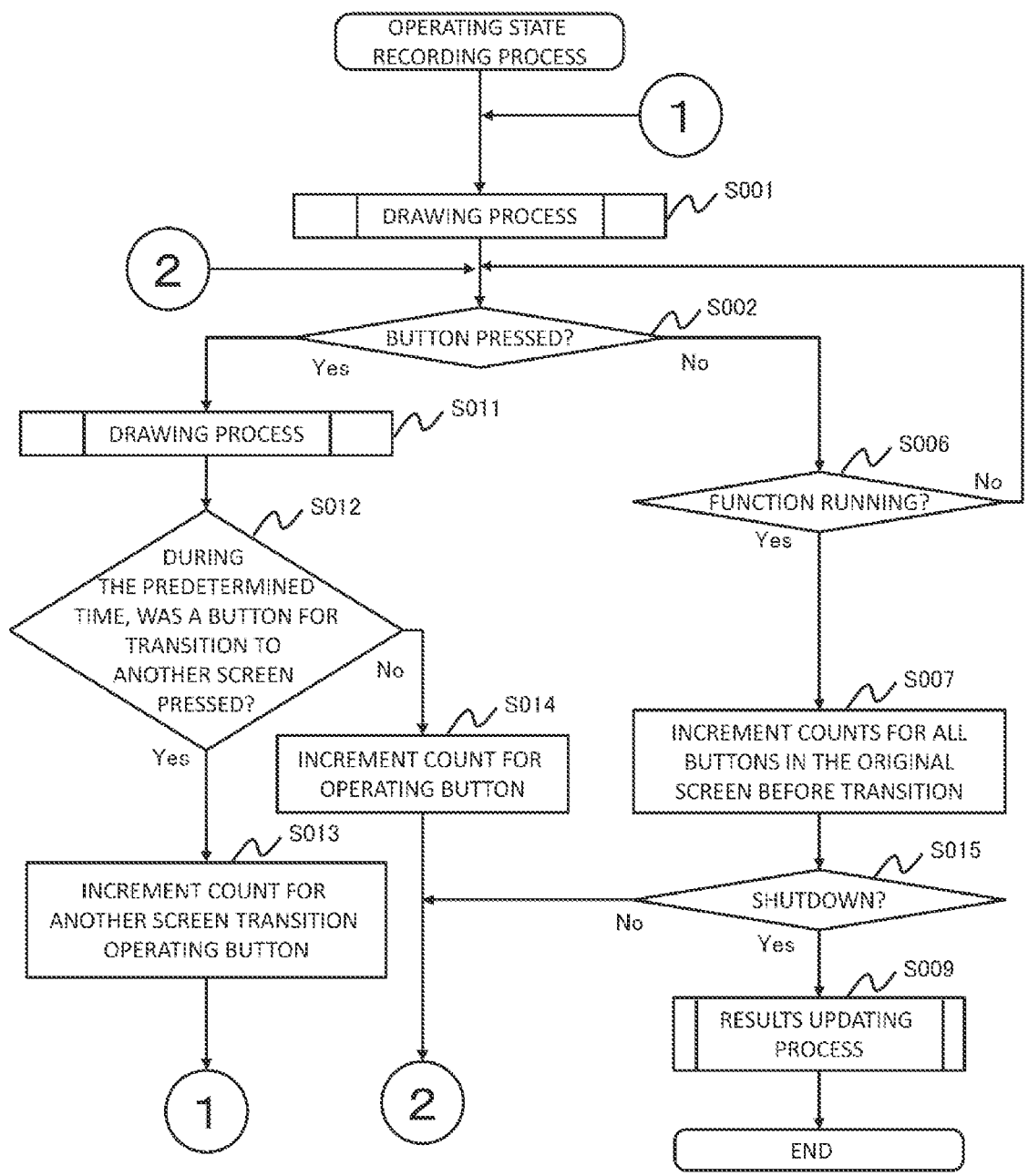
FIG. 10 is a diagram showing a modified example of an operating state recording process.

FIG. 10 is a diagram showing a modified example of the operating state recording process. In the modified example of the operating state recording process is basically the same as the operating state recording process, the description will be focused on the differences.

Specifically, in Step S002, immediately following detection of an input into an operating button ("Yes" in Step S002), the updating unit 115 performs the drawing process for the display screen that is the destination for the screen transition by the operating button (Step S011). In other words, a screen transition is performed.

After the display screen is displayed, the updating unit 115 determines whether there is a button operation for transitioning to another screen within a predetermined time (For example, within 2 seconds) (step S012). Specifically, the updating unit 115 acquires, through the input controlling unit 111, whether or not there has been either a tap or a long tap on an operating button for launching an operation involving a screen transition or a pop-up display. When a tap or a long tap is made to a different operation button, the updating unit 115 determines that there is a button operation for transitioning to another screen.

If there has been a button operation for a screen transition to another screen ("Yes" in Step S012), the updating unit 115 increments count for the operating button for the screen transition to the other screen (Step S013). More specifically, the updating unit 115 counts the number of operating buttons that have been operated to transition to another screen. That is, the updating unit 115 regards the operating button whose input is detected in Step S002 as an unintended operation and does not count up. Given this, the drawing unit 113 returns control to Step S001, to draw the screen that is the destination of the screen transition by the operating button for the screen transition to the other screen.

If there is no button operation to transition to another screen within a predetermined time ("No" in Step S012), the updating unit 115 counts up the operating buttons (step S014). More specifically, the updating unit 115 counts the operating button that has received the input in Step S002. Following this, the drawing unit 113 returns the control to Step S002, and receives an input to the operation button.

Additionally, if shutdown has not commenced in Step S008 of the operating state recording process in the first embodiment ("No" in Step S008), the drawing unit 113 returns control to Step S001, and refreshes the current screen, but this process is different in the modified example. Specifically, the drawing unit 113 returns control to Step S002, to receive an input into an operating button (Step S015).

The above is a modified example of the operating state recording process. According to the example of such processing, when the display screen before the transition is returned or another function (For example, starting a tuner playback function from a music playback function in an audio category) of the same category is performed within a predetermined time after the screen transition, the other function or the returned screen can be treated as the execution of the function intended by the user.

FIG. 11 is a diagram showing another example of incrementing an operating button. Specifically, in Step S012 through S014 of the operating state recording process in another example of the operating state recording process, it is determined that "there is a button operation for another screen transition" when there is an operating instruction to transition to another screen within a predetermined time interval after a screen transition. This state will be explained in detail using FIG. 11.

Music Player 501, Tuner 502, and Video Player 503 are displayed as operating buttons in the screen display 500 in FIG. 11. If, in the state wherein there was a touch input into the operating button of the Music Player 501 in the screen display 500, the operating button for the Tuner 515 for starting the tuner screen was then touched to switch to the tuner screen 520, prior to two seconds elapsing after displaying of the display screen 510 for the music player, the operating input into the operating button for the music player 501 will not be recorded (will not be counted), but rather the operation input into the operating button for the tuner 515 will be recorded (counted). This corresponds to a case wherein there was a button operation for a screen transition to a different screen in Step S012 in the operating state recording process of the modified example ("Yes" in S012), where the touch input into the operating button for the Music Player 501 is considered to be an unintended operation.

The above is a modified example of an embodiment according to the present invention. The information processing device according to this modified example enables screen customization to be performed more closely aligned with the intentions of the user, through controlling the user operation count more properly. Additionally, an appropriate operation count can be detected even if another function is started within the predetermined time interval after a screen transition. In other words, the information processing device according to modified example can be considered to be an information processing device comprising a displaying unit for displaying a display screen that has at least one operating button; a storing unit for storing button control information that includes, for each individual operating button, a record of the operation count of the operating button; a drawing unit for determining the display style for each individual operating button, using at least the button control information, to draw the display screen; and an updating unit for incrementing the count in the button control information for the operation count corresponding to the operating button related to the first operation if no second operation for a screen transition to another screen, that is not the second display screen, is received in a second display screen that is the screen transition destination for the screen transition by the first operation within a predetermined time interval after receiving, as the first operation, an input into one of the operating buttons that is displayed in the first display screen that is the aforementioned display screen.

Additionally, the various structures, functions, processing units, processing means, and the like, in whole or in part, may be achieved in hardware through, for example, designing an integrated circuit. Moreover, the various structures, functions, and the like, described above, may be achieved through software through interpreting and executing a program for achieving the respective functions. Information such as programs, tables, files, and the like, for achieving the individual functions may be placed in memory, a recording device such as a hard disk, an SSD, or the like, or a recording medium such as an IC card, an SD card, a DVD, or the like.

Additionally, control lines or data lines are noted when deemed necessary for the explanation, but not all control lines or data lines in the product are necessarily shown. In practice, substantially all of the structures can be thought of as being mutually connected.

EXPLANATIONS OF REFERENCE SYMBOLS

100: Information Processing Device
110: Processing Unit
111: Input Controlling Unit
112: Displaying Unit 113: Drawing Unit
114: Clock Unit
115: Updating Unit
120: Storing Unit
121: Button Control Information
122: Screen Information

The invention claimed is:

1. An information processing device, comprising:
a display displays one of a plurality of display screens that each include at least one of a plurality of operating buttons;
a memory stores button control information that includes a record of an operating count for each of the plurality of operating buttons; and
a processor communicatively connected to the display and the memory, and the processor:
determines a display style for each of the plurality of operating buttons, using at least the button control information,
draws one display screen, of the plurality of display screens, including a display style for at least one operating button of the plurality of operating buttons and a switching operating button of the plurality of operating buttons, and
determines, using the one display screen, an operating count corresponding to each of the at least one operating button by:
determining an input into one operating button of the at least one operating button displayed on the one display screen is received, as a first operation, and
on a condition that determining no second operation is received within a predetermined time after the first operation is received, incrementing an operating count for the one operating button that receives the first operation, or
on a condition that determining that the second operation is received, via the switching operating button, within the predetermined time after the first operation is received, incrementing an operating count of the switching operating button, and not incrementing the operating count of the one operating button,
wherein the second operation causes the processor to perform a screen transition from the one display screen to an other display screen of the plurality of display screens that is different from the one display screen,
wherein both the one display screen and the other display screen include the one operating button and the switching operating button, and
wherein the one operating button is a button that, upon reception of an input, triggers an operation involving a pop-up display.

2. The information processing device according to claim 1 wherein:
the memory further stores screen information that includes a record of display time for each of the plurality of display screens; and
the processor uses the button control information and the screen information to determine the display style for each of the plurality of operating buttons, to draw a display screen of the plurality of display screens.

3. The information processing device according to claim 2, wherein:
on a condition that a display time of a display screen is no less than a predetermined first threshold value and that a number of times the operating buttons are operated is below a predetermined second threshold for the operating buttons included in the display screen, the processor draws a different display screen with at least two operating buttons of the plurality of operating buttons, each with a different display style.

4. The information processing device according to claim 3, wherein:
the predetermined first threshold varies depending on a use time of the information processing device.

5. The information processing device according to claim 3, wherein:
the predetermined second threshold varies depending on a total of the operating count, for each of the plurality of operating buttons included in each of the plurality of display screens to which each of the plurality of operating buttons belong.

* * * * *